United States Patent [19]
Dixon et al.

[11] 4,019,107
[45] Apr. 19, 1977

[54] D. C. MOTOR CONTROL SYSTEM

[75] Inventors: George Scott Dixon; Edward O. Gilbert; Theodore A. Oliver, all of Ann Arbor, Mich.; James W. A. Wilson, Willoughby, Ohio

[73] Assignee: Reliance Electric Company, Euclid, Ohio

[22] Filed: Feb. 3, 1975

[21] Appl. No.: 546,201

[52] U.S. Cl. .............................. 318/338; 318/332; 318/432; 318/493
[51] Int. Cl.² .......................................... H02P 7/14
[58] Field of Search .......... 318/338, 493, 327, 317, 318/332, 432

[56] References Cited

UNITED STATES PATENTS

| | | | |
|---|---|---|---|
| 3,378,746 | 4/1968 | Weiser | 318/338 X |
| 3,569,809 | 3/1971 | Comer | 318/338 |
| 3,735,220 | 5/1973 | Renner | 318/493 X |
| 3,735,226 | 5/1973 | Pittner | 318/338 |
| 3,811,079 | 5/1974 | Tashiro | 318/338 |
| 3,887,855 | 6/1975 | Klimo | 318/338 |

*Primary Examiner*—B. Dobeck
*Attorney, Agent, or Firm*—David H. Wilson

[57] ABSTRACT

A direct current motor control system for generating current command signals to a unidirectional armature controller and a bidirectional field controller. A motor speed command is compared with the actual motor speed to generate a speed error signal. The system generates a current command signal from the average of the speed error signal wherein the current command signal is proportional to the square root of the desired motor torque. The absolute value of the current command signal is the input to the armature controller and the field controller receives the current command signal wherein the polarity of the signal determines the direction of current flow in the field winding for controlling the direction of rotation of the motor.

14 Claims, 6 Drawing Figures

D. C. MOTOR CONTROL SYSTEM

BACKGROUND OF THE INVENTION

1. Field of the Invention

This invention relates to control circuits for current controllers in general and more particularly to a control system for the shunt field and armature windings of a direct current motor.

2. Description of the Prior Art

Various systems for controlling the speed of a direct current electric motor have been disclosed in the prior art. Probably the most simple method of speed control is the use of an adjustable resistor in series with the armature circuit. The resistance is increased for starting or for short-time or intermittent slowdowns in its most common usage, but this control has the disadvantage of power loss in the resistor which decreases the system efficiency. A second type of speed control involves a constant armature voltage and a variable voltage applied to the field or an adjustable resistor in series with the field to achieve control over a speed range of approximately four or five to one. The maximum torque is limited by the permissible armature current and the maximum flux which, in turn, is limited by magnetic saturation or by heating of the field winding. This type of control has the disadvantage of slow response when the field current polarity is reversed to change the direction of rotation since larger horsepower motors generally have relatively large field time constants.

Another form of motor speed control involves the use of constant armature current and a variable field excitation. In addition to the disadvantage of the slow response time of the field, this type of control is less common than other controls since constant voltage sources are more readily available than constant current sources. Still another form of speed control is the constant field current and controlled armature voltage type. The armature may be supplied from a controlled rectifier voltage supply or a separately excited direct current generator which is commonly known as a Ward Leonard system.

In another form of speed control, both the armature and the field supply currents may be varied to control speed in response to a control circuit which defines a relationship between these two currents as a function of the speed error signal. For example, the field current may be controlled to reach its maximum value when the armature current has reached approximately one half of its maximum value. If the field controller is bidirectional and the armature controller is unidirectional relatively economical four quadrant (positive and negative values of speed plotted against positive and negative values of torque on coordinate axes) motor control system can be defined which responds to a speed error signal.

SUMMARY OF THE INVENTION

The present invention concerns a motor control system for generating current command signals to the field and armature controllers connected to a direct current shunt motor in response to a speed command signal. The motor speed command signal is compared with the actual motor speed to generate a speed error signal. The speed error signal is integrated to generate an average speed error signal. Since the speed-torque characteristic of a shunt motor is substantially linear, the average speed error signal can be utilized to generate the current command signals to the field and armature controllers.

For a separately excited direct current shunt motor, the torque is equal to a constant times the product of the field and armature currents. The present invention generates field and armature current command signals having normalized values proportional to the square root of the desired motor torque. For a four quadrant motor control system which produces positive or negative torque at positive or negative speed, a bidirectional field controller is utilized with a unidirectional armature controller. This combination of controllers permits the use of the simplest and least expensive type of armature controller which can operate from a three phase power source without a neutral. The field controller may be of the type disclosed in U.S. Patent Application Ser. No. 510,498, filed Sept. 30, 1974, now U.S. Pat. No. 3,947,738, issued Mar. 30, 1976, entitled "Pulsed Power Supply" and the armature controller may be of the type disclosed in U.S. Patent Application Ser. No. 579,921, filed May 22, 1975, entitled "Digital Firing Control For A Converter" which are copending with and assigned to the same assignee as the present application.

It is an object of the present invention to provide an improved motor control system for controlling the speed of a direct current motor.

It is another object of the present invention to provide an improved motor control system for the field current supplied to the shunt field winding and the armature current supplied to the armature winding of a direct current electric motor.

It is a further object of the present invention to provide an improved motor control system which utilizes more efficient and moe economical bidirectional field and unidirectional armature controllers.

It is another object of the present invention to generate field and armature current command signals having normalized values proportional to the square root of the desired motor torque.

DESCRIPTION OF THE PREFERRED EMBODIMENT

Figure 1:
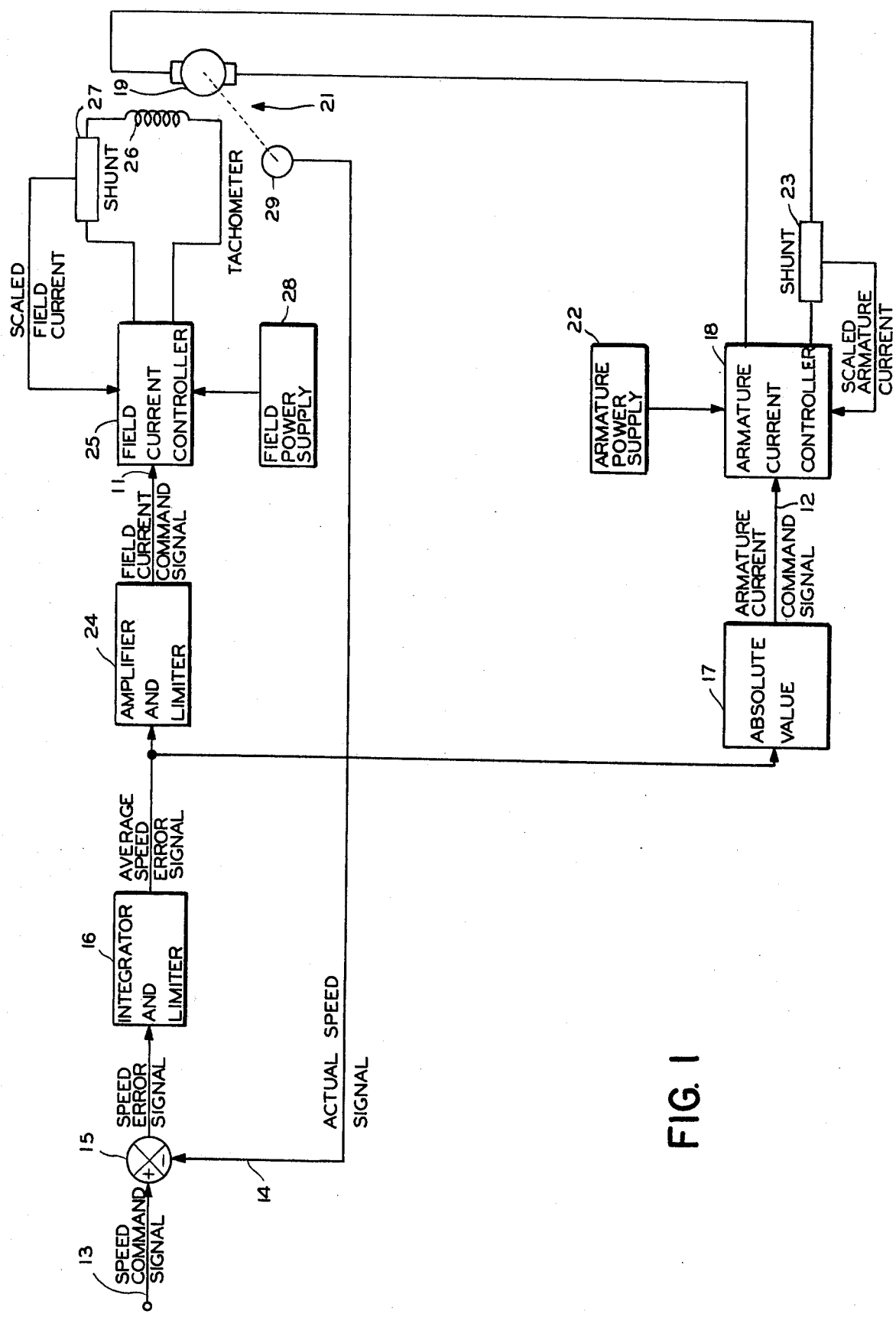
FIG. 1 is a functional block diagram of the present invention as utilized to control a direct current shunt field motor.

Referring to FIG. 1, there is shown a functional block diagram of the present invention for determining the speed and direction of rotation of a direct current shunt field motor by controlling the current flow in the field and armature windings. The control system generates a field current command signal on an input line 11 and an armature current command signal on an output line 12 in response to a speed command signal on an input line 13. The current command signals are both derived from the average speed error signal and are normalized in the sense that they have equal magnitudes for values representing corresponding proportions of the maximum field and armature currents. The normalized values of the current command signals are proportional to the square root of the motor torque at the desired motor speed. The speed command signal may be generated by a conventional signal pattern generator (not shown).

A signal, on a line 14, representing the actual speed of the motor being controlled is subtracted from the speed command signal at a summing point 15 to generate a speed error signal. The speed error signal is an input to an integrator and limiter 16 which generates an average speed error signal having one polarity when the speed command signal is greater than the actual speed signal and the opposite polarity when the speed command signal is less than the actual speed signal. The average speed error signal is limited to a predetermined maximum value as determined by the maximum allowable armature current.

An absolute value circuit 17 changes the average speed error signal to the unidirectional armature current signal on the output line 12. The armature current command signal is an input to an armature control 18 which provides direct current power to an armature 19 of a direct current shunt field motor 21.

Typically, the armature control 18 includes a three phase full-wave rectified silicon controlled rectifier bridge and a firing angle control circuit which converts three phase alternating current power from an armature power supply 22 to direct current power for the armature 19. The current flowing in the armature 19 is sensed with a shunt 23 to generate a scaled armature current feedback signal to the armature control 18. The armature control 18 is responsive to the difference between the armature current command signal and the scaled armature current signal to change the firing angle of the bridge and thereby the current flowing in the armature to eliminate any difference between the two signals. The firing angle control circuit may be a conventional phase angle control or it may be a digital firing control as disclosed in U.S. Patent Application Ser. No. 579,921, entitled "Digital Firing Control For A Converter". The digital firing control utilized the armature current command signal and the scaled armature current signal to generate firing commands to the silicon controlled rectifier bridge. These firing commands are referenced from the previously generated firing command rather than from the zero-crossing point of the alternating current input wave form to provide a faster and more accurate firing control.

The average speed error signal is also an input to an amplifier and limiter 24 which generates the field current command signal on the ouput line 11. The amplifier and limiter 24 limits the field current command signal to a predetermined maximum value as determined by the maximum allowable field current. The field current command signal is an input to a field control 25 which provides direct current power to a field winding 26 of the direct current shunt field motor 21. The current flowing in the field winding 26 is sensed with a shunt 27 to generate a scaled field current feedback signal to the field control 25. The field control 25 is responsive to the difference between the field current command signal and the scaled field current signal to change the amount of current flowing in the field winding 26 to eliminate any difference between the two signals.

Typically, the field control 25 includes a single phase full-wave rectified silicon controlled rectifier bridge and a firing angle control unit which convert single phase alternating current from a field power supply 28 to direct current power for the field winding 26. The field control 25 may also be a pulsed power supply as disclosed in U.S. Pat. No. 3,947,738, entitled "Pulsed Power Supply". The pulsed power supply is responsive to the field current command signal and the scaled field current signal to apply voltage pulses of opposite polarities to the field winding 26, whereby the average current flowing in the field winding is a function of the maximum voltage at which the voltage pulses are applied and the duty cycle of the control circuit. The direction of rotation of the motor 21 is determined by the direction of current flow in the field winding 26 which in turn is determined by the polarity of the field current command signal on the output line 11.

Therefore, the present invention is a control system for controlling the speed and direction of rotation of the direct current shunt field motor 21 by controlling the current flow in the field winding 26 and the armature 19. The motor speed is detected by a tachometer 29 which generates the actual speed signal on the line 14. The control system is responsive to the actual speed signal and a speed command signal to generate field and armature current command signals having normalized values proportional to the square root of the motor torque at the desired motor speed.

Figure 2:
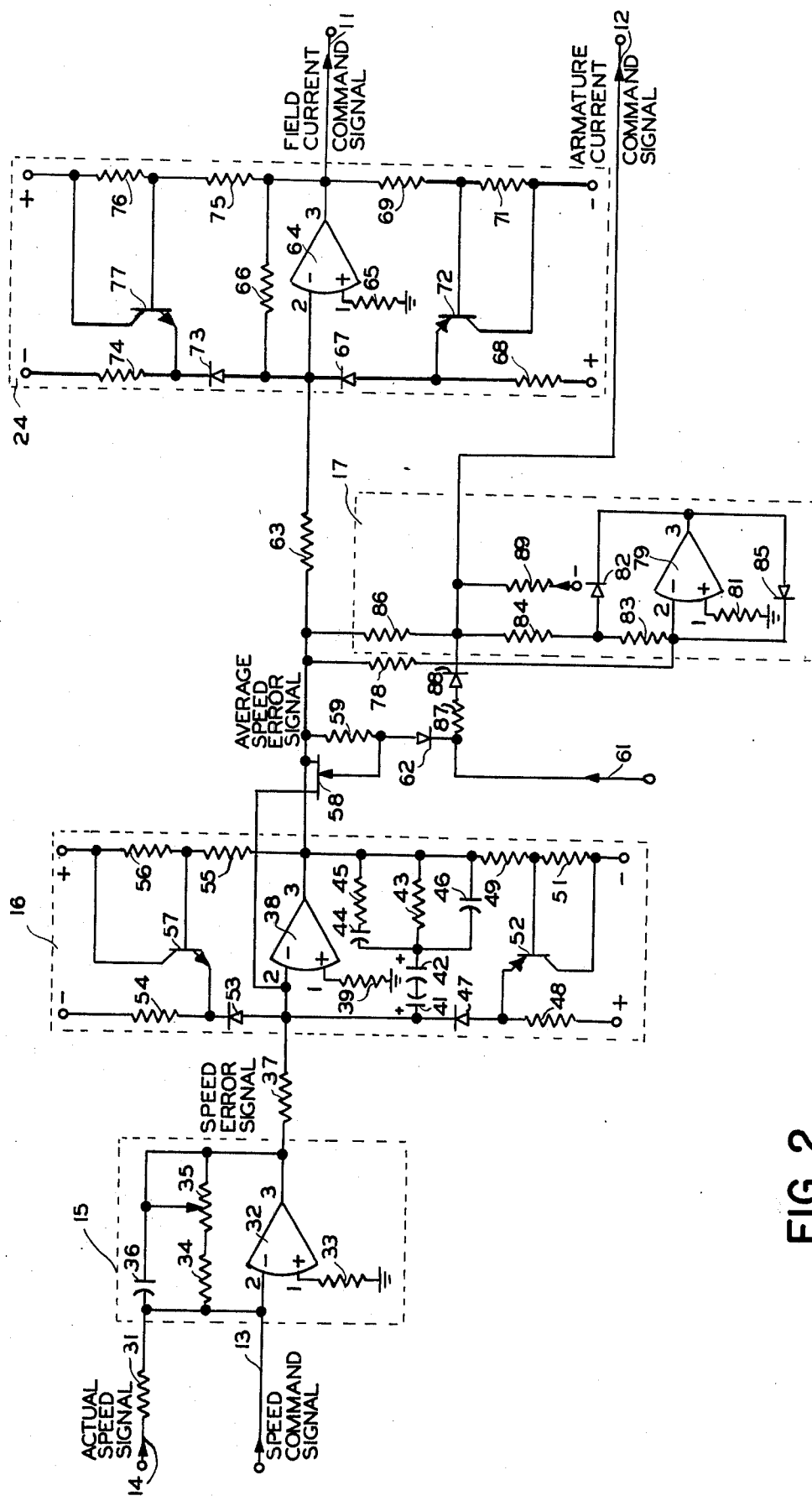
FIG. 2 is a schematic diagram of the motor control system of FIG. 1 according to the present invention.

Referring to FIG. 2, there is shown a schematic diagram of the motor control system of FIG. 1. The speed command signal on the input line 13 is an input to a circuit representing the summing point 15. The actual speed signal on the line 14 passes through a current limiting resistor 31 and also is an input to the summing circuit 15. The summing circuit 15 includes an operational amplifier 32 having a non-inverting input 32-1 connected to round through a resistor 33 and an inverting input 32-2 connected to the lines 13 and 14. The amplifier also has an output 32-3 connected to the inverting input 32-2 by resistor-capacitor feedback circuit. A fixed resistor 34 and an adjustable resistor 35 are connected in series between the input 32-2 and the output 32-3. A capacitor 36 is connected in parallel with the resistors 34 and 35 and also is connected to the tap point on the adjustable resistor 35. If the speed command signal and the actual speed signal are of opposite polarities, the difference between them will be inverted by the amplifier 32 at the output 32-3 to generate the speed error signal to the integrator and limiter 16.

The speed error signal passes through a current limiting resistor 37 to an inverting input 38-2 of an operational amplifier 38. When a noninverting input 38-1 is connected to ground through a resistor 39, the speed error signal is inverted at an output 38-3. The amplifier 38 is provided with a resistor-capacitor network connected between the input 38-2 and the output 38-3 for performing an integration on the speed error signal to generate the average speed error signal to the amplifier and limiter 24 and the absolute value circuit 17. A pair of capacitors 41 and 42 are connected in series with a resistor 43 between the input 38-2 and the output 38-3.

A capacitor 44 and a resistor 45 are connected in series and in turn are connected in parallel with the resistor 43. The resistor-capacitor network is completed by a capacitor 46 connected in parallel with the resistor 43.

The integrator and limiter 16 also includes a pair of limiting circuits which limit the maximum value of the average speed error signal. The positive limiting circuit includes a diode 47 having a cathode connected to the inverting input 38-2 and an anode connected to a positive power supply (not sown) through a resistor 48. The output 38-3 is connected to a negative power supply (not shown) through a pair of resistors 49 and 51 which are connected in series. A transistor 52 has a base connected at the junction of the resistors 49 and 51, an emitter connected to the junction of the diode 47 and the resistor 48, and a collector connected to the negative power supply (not shown). When the average speed error signal is less than the positive limit value, current will flow from the positive power supply (not shown), through the resistor 48, into the emitter and out of the collector of the transistor 52, and to the negative power supply (not shown). The voltage drop across the resistor 48 will reverse bias the diode 47 to prevent current flow through it from the positive power supply (not shown) to the inverting input 38-2. When the average speed error signal reaches the positive limit, there will be less bias voltage on the base of the transistor 52 and therefore, less current flow, which will reduce the voltage drop across the resistor 48. Diode 47 will then be forward biased to apply a positive voltage to the inverting input 38-2 which is added to the negative speed error signal to maintain the average speed error signal at the positive limit.

The negative limiting circuit includes a diode 53 having an anode connected to the inverting input 38-2 and a cathode connected to a negative power supply (not shown) through a resistor 54. The output 38-3 is connected to a positive power supply (not shown) through a pair of resistors 55 and 56 which are connected in series. A transistor 57 has a base connected at the junction of the resistors 55 and 56, an emitter connected to the junction of the diode 53 and the resistor 54 and a collector connected to the positive power supply (not shown). When the average speed error signal is greater than the negative limit value, current will flow from the positive power supply (not shown), into the collector and out of the emitter of the transistor 57, through the resistor 54, and to the negative power supply (not shown). The voltage drop across the resistor 54 will reverse bias the diode 53 to prevent current flow through it from the inverting input 38-2 to the negative power supply (not shown). When the average speed error signal reaches the negative limit, there will be less bias on the base of the transistor 57 and therefore, less current flow, which will reduce the voltage drop across the resistor 54. Diode 53 will then be forwarded biased to apply a negative voltage to the inverting input 38-2 which is added to the positive speed error signal to maintain the average speed error signal at the negative limit.

Figure 3:
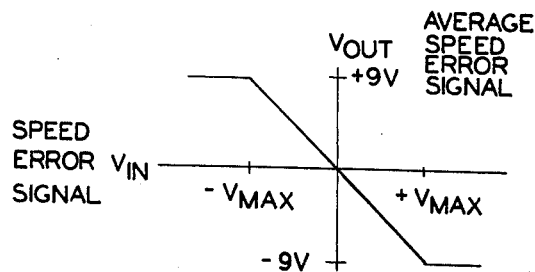
FIG. 3 shows a typical input-output characteristic for the average speed error signal as generated by the present invention.

Referring to FIG. 3, there is shown a typical average speed error signal versus speed error signal curve wherein the output signal is limited to ± 9 volts. Typically, the positive and negative power supplies may have a magnitude of 14 volts, the resistors 51 and 56 may have values of 14 kilohms, and the resistors 49 and 55 may have values of 9 kilohms. The gain of the amplifier 38 will determine the magnitude of the $\pm_{MAX}$ input for the speed error signal at which the average speed error signal is limited.

Referring again to FIG. 2, there is shown an N-channel field effect transistor (FET) 58 having a drain connected to the inverting input 38-2 and a source connected to the output 38-3. The source is also connected to a gate of the FET 58 through a resistor 59. When the FET 58 is turned on, the inverting input 38-2 will be connected to the output 38-3 to drive the integrator and limiter 16 output signal to zero. The control signal for the FET 58 is applied to a phase back drive input line 61 which is connected to the cathode of a diode 62. The diode 62 has an anode connected to the gate of the FET 58. If a negative voltage is applied to the line 61, the diode 62 will be forward biased to apply the negative voltage to the gate to turn off the FET 58 whereby the average speed error signal is generated at the output 38-3. If the negative voltage is removed and the line 61 is connected to ground or a positive voltage source, the diode 62 will be reverse biased to turn on the FET 58 thereby driving the average speed error signal to zero at the output 38-3 and resetting the system at zero velocity. The phase back drive signal to the line 61 may be generated by a motor control logic circuit (not shown) wherein the negative voltage signal is generated when the motor speed is to be controlled and the ground or positive voltage signal is generated when the motor is to be stopped.

The average speed error signal output from the integrator and limiter 16 is an input to the amplifier and limiter 24 through a current limiting resistor 63. The amplifier and limiter 24 includes an operational amplifier 64 having an inverting input 64-2 connected to the resistor 63. A noninverting input 64-1 is connected to ground through a resistor 65 and an output 64-3 is connected to the inverting input 64-2 by a feedback resistor 66 so that an output signal representing the field current command signal is generated on the output line 11 in response to the average speed error signal. The field current command signal is bidirectional for determining the direction of rotation of the motor and has a magnitude determined by the gain of the amplifier 64 and a pair of limiting circuits.

A postive limiting circuit includes a diode 67 having a cathode connected to the inverting input 64-2 and an anode connected to a positive power supply (not shown) through a resistor 68. The output 64-3 is connected to a negative power supply (not shown) through a pair of resistors 69 and 71 which are connected in series. A transistor 72 has a base connected at the junction of the resistors 69 and 71, an emitter connected to the junction of the diode 67 and the resistor 68, and a collector connected to the negative power supply (not shown). When the field current command signal is less than the positive limit value, current will flow from the positive power supply (not shown), through the resistor 68, into the emitter and out of the collector of the transistor 72, and to the negative power supply (not shown). The voltage drop across the resistor 68 will reverse bias the diode 67 to prevent current flow through it from the positive power supply (not shown) to the inverting input 64-2. When the field current command signal reaches the positive limit, there will be less bias voltage on the base of the transistor 72 and therefore, less current flow, which will reduce the voltage drop across the resistor 68. Diode 67 will then be forwarded biased to apply a positive voltage to the inverting input 64-2 which is added to the negative average error signal to maintain the field current command signal at the positive limit.

The negative limiting circuit includes a diode 73 having an anode connected to the inverting input 64-2 and a cathode connected to a negative power supply (not shown) through a resistor 74. The output 64-3 is connected to a positive power supply (not shown) through a pair of resistors 75 and 76 which are connected in series. A transistor 77 has a base connected at the junction of the resistors 75 and 76, an emitter connected to the junction of the diode 73 and the resistor 74, and a collector connected to the positive power supply (not shown). When the field current command signal is greater than the negative limit value, current will flow from the positive power supply (not shown), into the collector and out of the emitter of the transistor 77, through the resistor 74, and to the negative power supply (not shown). The voltage drop across the resistor 74 will reverse bias the diode 73 to prevent current flow through it from the inverting input 64-2 to the negative power supply (not shown). When the field current command signal reaches the negative limit, there will be less bias on the base of the transistor 77 and therefore, less current flow, which will reduce the voltage drop across the resistor 74. Diode 73 will then be forward biased to apply a negative voltage to the inverting input 64-2 which is added to the positive average error signal to maintain the field current command signal at the negative limit.

Figure 4:
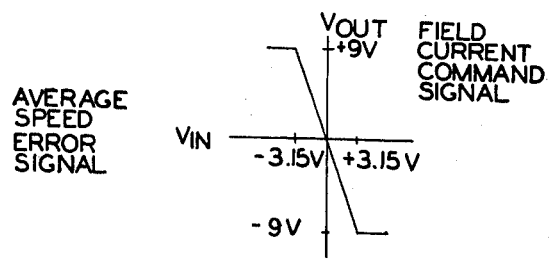
FIG. 4 shows a typical input-output characteristic for the field current command signal as generated by the present invention.

Referring to FIG. 4, there is shown a typical field current command signal versus average speed error signal curve wherein the output signal from the amplifier and limiter 24 is limited to ± 9 volts representing the maximum field current command signal. Typically, the values of the resistors 69, 71, 75, and 76 and the magnitudes of the positive power supplies are the same as for the corresponding elements of the integrator and limiter 16. The power supplies may have a magnitude of 14 volts, the resistors 71 and 76 may have values of 14 kilohms, and the resistors 69 and 75 may have values of 9 kilohms. The resistors 63 and 66 are selected so that for 3.15 volts of average speed error signal at the inverting input 64-2 the amplifier and limiter 24 will generate 9 volts of field current command signal on the output line 11.

Referring again to FIG. 2, there is shown the absolute value circuit 17 which receives the average speed error signal through a current limiting resistor 78. The absolute value circuit 17 includes an operational amplifier having a noninverting input 79-1 connected to ground through a resistor 81 and an inverting input 79-2 connected to the resistor 78. A positive polarity input signal at the inverting input 79-2 is changed to a negative polarity signal at an output 79-3. The negative polarity output signal is passed through a diode 82 which has a cathode connected to the output 79-3. A feedback resistor 83 is connected between an anode of the diode 82 and the inverting input 79-2. The negative polarity output signal passes through a current limiting resistor 84 to be summed on the output line 12.

A negative polarity input signal at the inverting input 79-2 is changed to a positive polarity signal at the output 79-3. The positive polarity output signal is blocked by the diode 82 but is returned to the inverting input 79-2 by a feedback diode 85 which has an anode connected to the output 79-3 and a cathode connected to the inverting input 79-2. If the resistors 78 and 83 are selected so that the amplifier 79 has unity gain, the amplifier 79 and the diodes 82 and 85 will function as a half-wave rectifier which passes a positive polarity average speed error signal in inverted form but blocks a negative polarity average speed error signal.

A resistor 86 is connected between the output 38-3 of the operational amplifier 38 and the output line 12 to apply the average speed error signal to the line 12. If the value of the resistor 86 is approximately twice the value of the resistor 84, then the magnitude of the current flowing in the resistor 86 will be approximately one half of the magnitude of the current flowing in the resistor 84. Since these currents are of opposite polarities when the average speed error signal is of a positive polarity, the armature current command signal on line 12 will be generated by the summation of the two currents and will be a negative polarity replica of the average speed error signal. When the average speed error signal is of a negative polarity, the positive polarity output signal from the operational amplifier 79 is blocked by the diode 82. Therefore, the negative polarity average error signal is connected to the output line 12 through the resistor 86 to generate the armature current command signal. From the above it may be seen that the absolute value circuit generates a negative polarity armature current command signal on the output line 12 which represents the magnitude of the average speed error signal generated by the integrator and limiter 16.

The absolute value circuit 17 also is connected to the phase back drive input line 61 through a resistor 87 and a diode 88. The diode 88 has an anode connected to the resistor 87 and a cathode connected to the output line 12. When the negative voltage is applied to the line 61, the diode 88 will be reverse biased to block the negative voltage from the output line 12. If a positive voltage is applied to the line 61, the diode 88 will be forward biased to pass the signal to the output line 12. Current will flow through the resistor 87, the diode 88 and a resistor 89 to a negative power supply (not shown). If the positive voltage on the output line 12 is sufficiently high, as determined by the values of the resistors 87 and 89 and the magnitudes of the positive voltage on line 61 and the negative voltage from the power supply, an armature current command signal will be generated which may represent a command for maximum advancement of the firing angle to the armature current controller 18 to quickly reduce the armature current to zero and stop the motor.

Figure 5:
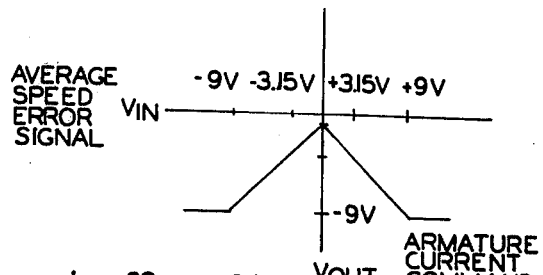
FIG. 5 shows a typical input-output characteristic for the armature current command signal as generated by the present invention.

Referring to FIG. 5, there is shown an armature current command signal versus average speed error signal curve wherein the output signal from the absolute value circuit 17 is a unidirectional command signal limited at a negative 9 volts for ±9 volts input signal. The curve is displaced from the origin by a bias signal generated from a negative voltage power supply (not shown) connected to the output line 12 through the resistor 89 as shown in FIG. 2. The bias signal provides a relatively small amount of armature current at zero speed and generates a relatively linear function for the armature current command signal near zero speed to overcome any nonlinear characteristics of the amplifiers 32, 38, and 79 for small input signals. During the application of the phase back drive signal on the line 61, the bias signal is swamped by the maximum advancement signal.

Referring to FIGS. 4 and 5, it may be seen that the field current command signal is a maximum for ±3.15 volts whereas the armature current command is a maximum for ±9 volts. However, for ±3.15 volts input the armature current command signal is approximately −3.91 volts and the armature and field current controllers, 18 and 25 respectively of FIG. 1, may be responsive to control the motor at a predetermined maximum speed under conditions of a predetermined maximum load. For example, the motor 19 of FIG. 1 may be the hoist motor in an elevator system which is controlled at a maximum speed with a fully loaded elevator car. That portion of the armature current command signal generated between the ±3.15 volts and ±9 volts average speed error signal may be utilized to slow the elevator car to a stop since the motor speed is proportional to the applied motor voltage minus the IR drop in the armature. When the motor has stopped, a phase back signal is sent to line 61 of FIG. 2 to reset the average speed error signal and fully advance the firing angle for the armature controller.

Figure 6:
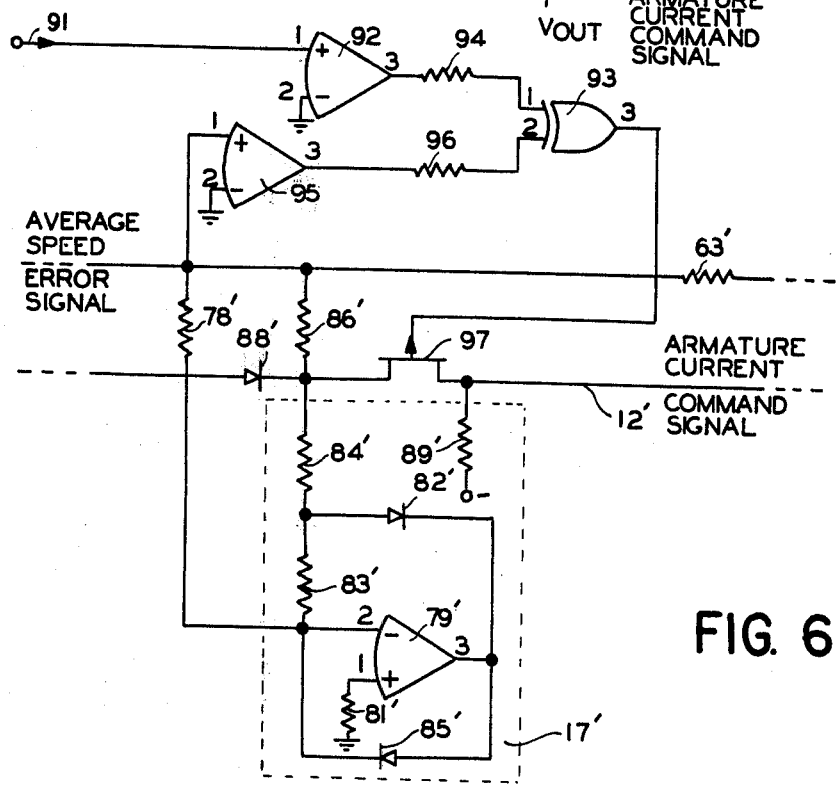
FIG. 6 is a schematic diagram of an alternate embodiment of the present invention for step speed command signals.

Referring to FIG. 6, there is shown an alternate embodiment of the present invention suitable for use with a step function speed command signal. Elements common to FIGS. 2 and 6 have the same reference numerals with the addition of a prime (N') in FIG. 6. With the system of FIG. 2, a step command which requires a reversal of the direction of rotation and an increase in the armature current generates an initial increase in the torque before the torque is driven through a zero level to reverse the direction of rotation. This initial increase is due to the relatively short armature time constant which allows the unidirectional armature current to increase before the relatively long field time constant allows the field current to proportionally decrease as it is reversed.

One technique for eliminating this initial torque increase is armature blanking wherein the armature current is held at zero during the time the field current is changing signs. A signal representing the polarity of the field current is applied to an input line 91 which is connected to a non-inverting input 92-1 of an operational amplifier 92. An inverting input 92-2 is connected to ground and an output 92-3 is connected to an input 93-1 of an exclusive - OR gate 93 through a current limiting resistor 94. The average speed error signal is applied to a non-inverting input 95-1 of an operational amplifier 95 having an inverting input 95-2 connected to ground. An output 95-3 of the amplifier 95 is connected to an input 93-2 of the exclusive - OR gate 93 through a resistor 96.

The exclusive - OR gate 93 generates a "1" or positive logic signal at an output 93-3 when the signals at the inputs 93-1 and 93-2 are of opposite polarities and generates a "0" or negative logic signal when the input signal are of the same polarity. If under steady state conditions the field current signal has the same polarity as the average speed error signal, the exclusive - OR gate 93 will generate a "0" to the gate of a P-channel FET 97 to turn it on. The FET will then pass the armature current command signal from the absolute value circuit 17' to the outlet line 12'. When a step speed command signal is applied to reverse the direction of rotation, the average speed error signal will change to the opposite polarity and the exclusive-OR gate 93 will generate a "1" at the output 93-3. The "1" will turn off the FET 97 to disconnect the line 12' from the absolute value circuit 17' and remove the armature current command signal. Therefore, there will be no current flowing in the armature until the field current has reversed to change the polarity of the signal at the input 93-1. With both input signals at the same polarity, the exclusive - OR gate will again generate a "0" to turn on the FET 97 to apply the armature current command signal.

In summary, the present invention relates to a motor control system for a separately excited direct current shunt field motor. The control system generates field and armature current command signals to the field and armature controllers in response to a speed error signal. The speed error signal is the difference between a speed command signal and a signal representing the actual speed of the motor. The speed error signal is then integrated to obtain an average speed error signal which is utilized to generate field and armature current command signals, having normalized values proportional to the square root of the desired motor torque.

A bidirectional field controller is responsive to the field current command signal to control the magnitude and direction of the field current wherein the direction of the field current determines the direction of rotation of the motor. A unidirectional armature controller is responsive to the armature current command signal to control the magnitude of the armature current. Since the separately excited shunt field motor, the torque is proportional to the product of the field and armature currents and the speed-torque characteristic is substantially linear, control of the currents will control the motor speed.

The control system may include an armature current bias signal which provides a relatively small amount of armature current at zero speed. This bias signal will generate a relatively linear function for the armature current command signal near zero speed to overcome any nonlinear characteristics of the system elements for small input signals. The control system may also include an armature blanking circuit for holding the armature current at zero during the time the field current is required to change signs.

In views of the above, it may be seen that a number of modifications may be made to the system of the present invention as to individual components and their combinations without departing from its spirit and scope. Accordingly, it is to be appreciated that the detailed example set forth above is for illustrative purposes and is not to be read in a limiting sense.

What we claim is:

1. A control circuit for a direct current shunt field electric motor having a field current controller and an armature current controller, comprising:
    a source of a speed command signal for said motor;
    a source of a signal representing the actual speed of said motor; and
    means responsive to said speed command signal and said actual speed signal for generating current command signals to said field and armature controllers wherein the normalized values of said current command signals are proportional to the square root of the motor torque at the desired motor speed represented by said speed command signal.

2. A control circuit as defined in claim 1 wherein said means for generating current command signals includes summing means responsive to said speed command signal and said actual speed signal for generating a speed error signal; means responsive to said speed error signal for generating an average speed error signal; means responsive to said average speed error signal for generating said field current command signal; and means responsive to said average speed error signal for generating said armature current command signal.

3. A control circuit as defined in claim 2 wherein said speed command signal and said actual speed signal have opposite polarities for the same direction of rotation of said motor and said speed error signal is generated by adding said speed signals together.

4. A control circuit as defined in claim 2 wherein said summing means includes an amplifier having an input connected to said speed command signal source and said actual speed signal source and having an output connected to said means for generating an average speed error signal.

5. A control circuit as defined in claim 2 wherein said means for generating an average speed error signal includes an integrator having an input connected to said summing means and an output connected to said means for generating said field current command signal and connected to said means for generating said armature current command signal.

6. A control circuit as defined in claim 5 wherein said means for generating an average speed error signal includes means for limiting the magnitude of said average speed error signal to a predetermined maximum value.

7. A control circuit as defined in claim 5 including means to selectively connect said integrator input to said integrator output to set said average speed error signal to zero.

8. A control circuit as defined in claim 2 wherein said means for generating said field current command signal includes an amplifier having an input connected to said means for generating an average speed error signal for generating said field command signal.

9. A control unit as defined in claim 8 wherein said means for generating said field current command signal includes means for limiting the magnitude of said field current command signal to a predetermined maximum value.

10. A control circuit as defined in claim 2 wherein said means for generating said armature current command signal includes means responsive to said average speed error signal for generating a signal representing the absolute value of said average speed error signal.

11. A control circuit as defined in claim 10 wherein said absolute value signal means includes means responsive to said average speed error signal of one polarity for generating a first output signal representing said average speed error signal at a first magnitude with the opposite polarity and responsive to said average speed error signal of the opposite polarity for removing said first output signal; means responsive to said average speed error signal for generating a second output signal representing said average speed error signal at a second magnitude with the same polarity; and means responsive to said first and second output signals for generating said armature current command signal.

12. A control circuit as defined in claim 11 wherein said first magnitude is twice as great as said second magnitude.

13. A control circuit as defined in claim 2 including a source of a phase back drive signal and means responsive to said phase back drive signal for generating a signal representing zero armature current to said armature controller.

14. A control circuit as defined in claim 2 including means for generating an armature current command signal at a predetermined minimum value connected to the output of said means for generating an armature current command signal.

* * * * *

UNITED STATES PATENT AND TRADEMARK OFFICE
CERTIFICATE OF CORRECTION

PATENT NO. : 4,019,107
DATED : April 19, 1977
INVENTOR(S) : George Scott Dixon et al.

It is certified that error appears in the above-identified patent and that said Letters Patent are hereby corrected as shown below:

| | |
|---|---|
| Column 1, line 53 | before "relatively" insert -- , a -- . |
| Column 2, line 36 | change "moe" to -- more -- . |
| Column 3, line 28 | after "rent" insert -- command -- . |
| Column 3, line 49 | change "utilized" to -- utilizes -- . |
| Column 4, line 43 | change "round" to -- ground -- . |
| Column 5, line 10 | change "(not sown)" to -- (not shown) -- . |
| Column 5, line 57 | change "forwarded" to -- forward -- . |
| Column 5, line 68 | change "$\pm_{MAX}$" to -- $\pm V_{MAX}$ -- . |
| Column 9, line 59 | change "outlet" to -- output -- . |
| Column 10, line 24 | change "the separately" to -- for a separately -- . |
| Column 12, line 1 | change "unit" to -- circuit -- . |

Signed and Sealed this

Sixteenth Day of January 1979

[SEAL]

Attest:

RUTH C. MASON
Attesting Officer

DONALD W. BANNER
Commissioner of Patents and Trademarks